Nov. 28, 1944.     A. R. THOMPSON     2,363,818
FOOD PROCESSING APPARATUS
Filed Jan. 26, 1942     4 Sheets-Sheet 1

FIG_1

Inventor
ALBERT R. THOMPSON
By Philip A. Minnis
Attorney

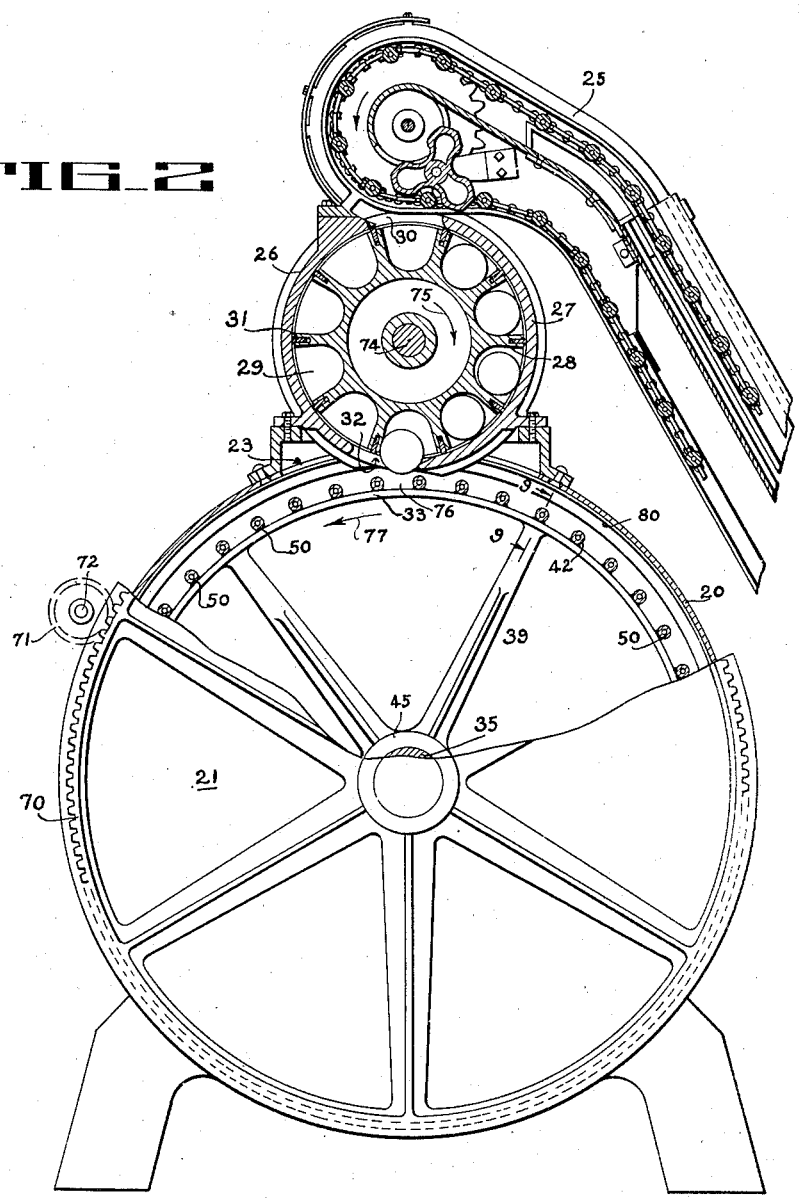

Nov. 28, 1944.　　　A. R. THOMPSON　　　2,363,818
FOOD PROCESSING APPARATUS
Filed Jan. 26, 1942　　　4 Sheets-Sheet 3
FIG_3
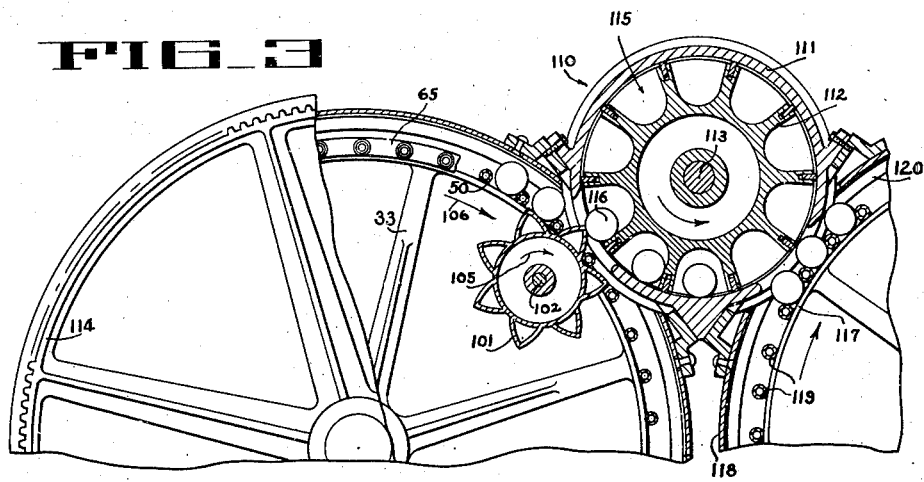
FIG_4
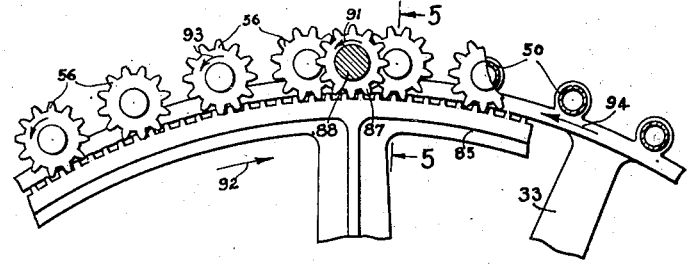
FIG_5
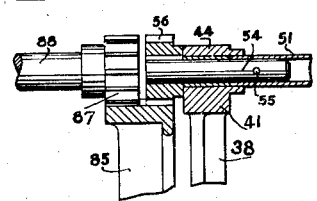
Inventor
ALBERT R. THOMPSON
By Philip A. Minnis
Attorney Nov. 28, 1944.  A. R. THOMPSON  2,363,818
FOOD PROCESSING APPARATUS
Filed Jan. 26, 1942   4 Sheets-Sheet 4
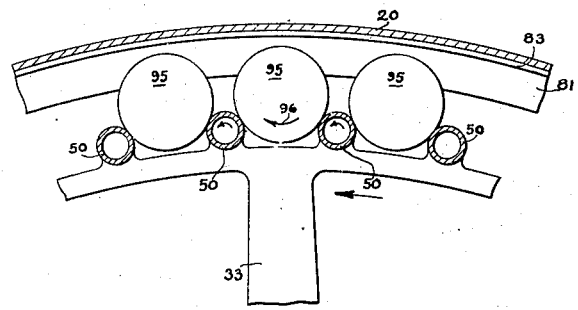
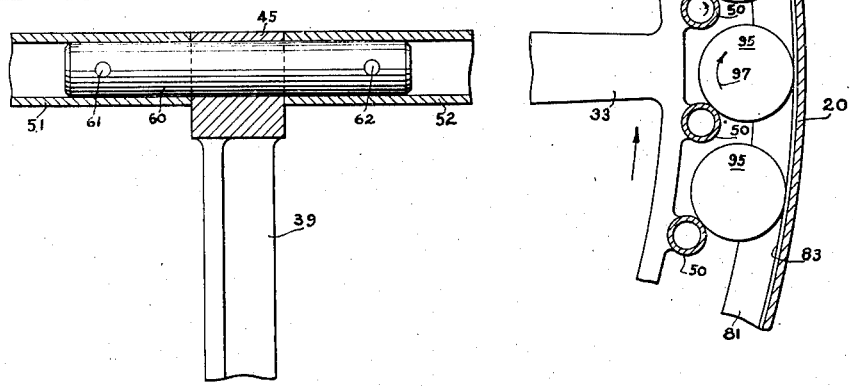
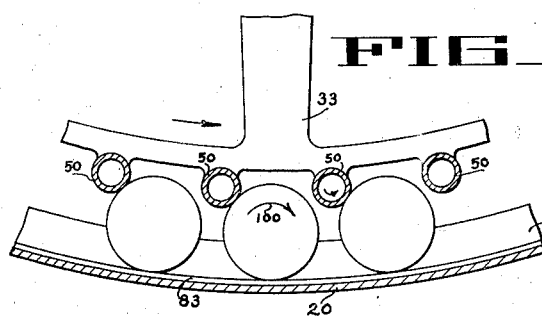
Inventor
ALBERT R. THOMPSON
By Philip A. Minnis
Attorney Patented Nov. 28, 1944

2,363,818

UNITED STATES PATENT OFFICE 2,363,818

FOOD-PROCESSING APPARATUS

Albert R. Thompson, Los Gatos, Calif., assignor to Food Machinery Corporation, San Jose, Calif., a corporation of Delaware Application January 26, 1942, Serial No. 428,160

15 Claims. (Cl. 259—54)

This invention relates to apparatus for processing food products, particularly liquids, such as evaporated milk, sealed in containers. More specifically the invention relates to apparatus employed in continuous processing where the containers are conveyed in continuous procession through a series of chambers in which the treatment is carried out.

Treatment chambers in which my invention is useful are well-known and are employed for a variety of purposes such as cooking foods, sterilizing milk, and other processes involving heat exchange, and in some cases, agitation. An example of such an apparatus will be found disclosed in Patent No. 2,092,434, issued to me September 7, 1937.

As the invention is particularly valuable when applied to apparatus for processing evaporated milk I shall herein disclose the invention as embodied in an apparatus intended for that purpose, and specifically as embodied in a sterilizer.

One object of my invention is to provide apparatus of the character described with means for improving the heat exchange. Heretofore, especially when raising the milk temperature to sterilizing temperature the air space in the container was a source of trouble because the portion of the container wall adjacent the air space being, in effect, insulated thereby from the milk, became much hotter than the body of the milk so that when the milk came into contact with this portion of the container wall it tended to burn-on, grain, darker in color, and acquire burnt flavor. With my improved construction the milk and the container are constantly in motion so that no static condition occurs in which the container wall against the air space can become too hot. Furthermore, I keep a continuous bath of milk on the wall of the container so that at all times the entire interior of the container is in contact with the milk and the heat exchange continues without damage even in the neighborhood of the air space.

Another advantage of this construction is that it permits increasing the temperature differential between the heating medium and the milk with the result that the temperature rise of the milk can be further speeded up, thus shortening the time of the heat treatment, which, in turn, is highly desirable because it results in milk of improved quality.

Aside from the considerations of heat exchange the invention is also applicable where agitation of the milk is needed, for example, in the cooler to prevent the formation of skin.

Another object of the invention is to provide apparatus of the character described with means for continuously rotating the container on its own axis as it is simultaneously conveyed around and through the treatment chamber.

Other objects will become evident after the following disclosure of an embodiment of the invention.

In the drawings:

Fig. 1 is a side elevation of a sterilizer with the upper portion in vertical section.

Fig. 2 is an elevation of the feed end thereof with the upper portion in section. The plane of the section is indicated by the arrows 2—2 in Fig. 1.

Fig. 3 is a partial view of the discharge end thereof with a portion in vertical section. The plane of the section is indicated by the arrows 3—3 in Fig. 1.

Fig. 4 is a fragmentary view of the gearing provided for rotating the rolls.

Fig. 5 is a transverse section therethrough.

Figs. 6 to 8 illustrate the operation of the rolls in different positions.

Fig. 9 is a detail view.

Referring to Fig. 1, the sterilizer comprises a pressure tight chamber formed by means of a cylindrical shell 20, the ends of which are enclosed by heads 21, 22. The chamber has an inlet 23 through which the cans of evaporated milk are fed and an outlet 24 through which they are discharged after traveling through the chamber. Means (not shown) are provided for supplying a heating medium, such as steam, to the chamber.

A can feeding means of well-known construction is employed. It comprises an elevator 25 (Figs. 1 and 2) which deposits the cans in a feed valve 26 mounted on the shell 20 over the inlet 23. The feed valve has a cylindrical casing 27 in which a turret 28 rotates. The turret has peripheral pockets 29 which receive the cans from the elevator through an aperture 30 in the casing. Seals 31 prevent the loss of steam and pressure from the chamber. Upon rotation of the turret the cans are carried around to a discharge outlet 32 in the bottom of the casing from which they drop into the reel 33.

The reel which is of novel construction will now be described. A shaft 35 extends longitudinally through the chamber and is journaled in bearings 36, 37 in the heads 21, 22, respectively. Three spiders 38, 39, 40 are secured to the shaft 35 as shown in Fig. 1. These spiders 38, 39, 40 have rims 41, 42, 43 respectively, having bearings 44, 45, 46, respectively, formed thereon which are equally spaced apart circumferentially on their respective rims. The three spiders are secured to the shaft so that corresponding bearings are in longitudinal alignment.

A series of rolls 50 (Fig. 1) are rotatably supported in these bearings, so that they extend longitudinally of the reel from the inlet 23 to the outlet 24. As can be seen in Fig. 2, the rolls are equally spaced apart circumferentially of the reel, so as to support the cans in the channels therebetween. The rolls are identical in construction so a detailed description of one will suffice. It comprises three tubes 51, 52, 53 (Fig. 1) rigidly connected together in alignment by short shafts which are journaled in the spider bearings. At one end of the tube 51 (Fig. 5) a short shaft 54 is inserted therein and secured by a pin 55. The shaft rotates in the bearing 44 and has a pinion 56 secured to its projecting end. The opposite end of the tube 51 (Fig. 9) has a short shaft 60 inserted therein and secured thereto by a pin 61. The shaft 60 is journaled in the bearing 45 on the intermediate spider 39. The other end of the shaft 60 is inserted in the tube 52 and is secured thereto by a pin 62. The shaft 60 rotates in the bearing 45 and serves to connect the tubes 51, 52 rigidly together. The tubes 52 and 53 are interconnected in the same manner, the connecting shaft (not shown) being secured thereto by pins 63, 64 (Fig. 1) and being journaled in the bearing 46. The outer end of the tube 53 is rotatable in an aperture provided therefor in a ring 65 which serves to maintain the outer ends of the tubes 53 in spaced apart relation and which is supported by the tubes. The tubes 53, being short in length, overhang from the bearings 46 by which they are supported. The tubes 51, 52, 53 thus comprise a unitary roll 50 rotatably carried in the bearings of the reel.

Conventional means are provided for rotating the reel 33. A gear 70 (Fig. 1) is secured to the inlet end of the reel shaft 35 and meshes with a driving pinion 71 (Fig. 2) on a shaft 72 driven from a source of power (not shown). The gear 70 engages with a pinion 73 (Fig. 1) on a shaft 74 which extends into the feed valve casing 27 where it has the valve turret 28 secured thereto, and by this arrangement the feed valve is operated in timed relationship with the reel so that as the turret 28 (Fig. 2) rotates in the direction of the arrow 75 the cans are successively dropped from the pockets 29 through the outlet 32 into the troughs 76 between adjacent rolls 50. The reel 33 is rotated in the direction of the arrow 77 and carries the cans around the interior of the shell 20.

A canway 80 (Figs. 1 and 2) of conventional construction is provided for advancing the cans along the rolls 50 from the inlet 23 to the outlet 24 as the reel rotates. The construction of a canway of this type is well-known and will accordingly not be described in detail. In general it comprises a rail 81 to T-section coiled in the form of a helix and rigidly secured to the shell 20. The rib 82 of the rail engages the ends of the cans, the cans being confined between adjacent ribs 82 which guide them in a helical path around the interior of the chamber. The flanges 83 of the rail extend longitudinally of the reel and cooperate with the cans in a manner presently to be described.

Means are provided for rotating the rolls 50 as the reel rotates. A gear 85 is journaled on the shaft 35 by means of a bearing 86 so that the gear 85 is rotatable with respect to the reel shaft. All the roll pinions 56 engage with the gear 85. The gear is driven by means of a driving pinion 87 on a shaft 88 which is journaled in a bearing and stuffing box 89 in the head 21. The projecting end of the shaft 88 indicated by the arrow 90 is adapted to be driven from an independent source of power (not shown) which is preferably variable as to speed. The shaft 88 (Fig. 4) is rotated in the direction of the arrow 91 so that the driving pinion 87 rotates the gear 85 clockwise in the direction of the arrow 92. The roll pinions 56 which mesh with the gear 85 are thereby rotated counter-clockwise in the direction of the arrow 93. The reel 33 rotates counter-clockwise in the direction of the arrow 94. By this arrangement the rolls are given speed-up rotation. Assuming that the gear 85 was motionless and the reel 33 was rotating in the direction of the arrow 94 then the roll pinions 56 would roll on the stationary gear 85 in the direction of the arrow 93. By rotating the gear 85 in the opposite direction to the direction of rotation of the reel the roll pinions 56 are given an increased rate of rotation.

The principal function of the rolls 50, which act as can-engaging members, is to insure that each can receives rotation on its own axis during the entire time the can is being carried around by the reel. The manner in which this is effected is illustrated diagrammatically in Figs. 6 to 8. When the cans 95 (Fig. 6) are in the top of the chamber they do not engage the flange 83 of the canway rail 81 but are entirely supported by the rolls 50, each can being disposed in the trough between adjacent rolls and in engagement with both rolls which impart rotation thereto in the direction of the arrow 96.

When the cans are in the side of the shell as shown in Fig. 7, each can is in engagement with the flange 83 of the canway rail and is also in engagement with one roll 50. It will be noted that the space intervening between the roll and the canway is less than the diameter of the can so that the can is confined to the longitudinal channel on the reel in which it was originally deposited. The can rotates clockwise in the direction of the arrow 97 either because it rolls on the canway or because it is rotated by the roll 50. Which of these causes the rotation of the can will depend on which supports the major part of the can weight.

The entire weight of the can is supported by the canway when the can is in the bottom of the shell as shown in Fig. 8. The can rotates in the direction of the arrow 100. The rotation is due to the can rolling on the canway. One roll 50 engages the can pushing it along the canway. The peripheral speed of the roll exceeds the normal peripheral speed of the can due to its rolling on the canway. This enables the roll to overcome any tendency of the can to be pinched between the roll and the canway.

In this manner the cans are continuously rotated on their own axes as they are guided from the inlet 23 (Fig. 1) to the outlet 24 by the guideway or canway 80. Upon arrival at the discharge end of the reel the cans are removed therefrom by means of a star wheel 101 (Fig. 3) which is rotatably supported on a shaft 102 in a bracket 103 (Fig. 1) secured to the shell 20. The star wheel 101 meshes with the rolls 50 and is rotated in the direction of the arrow 105 by rotation of the reel in the direction of the arrow 106. The cans are ejected into the pockets of a transfer valve indicated generally at 110 which may be of a construction similar to that disclosed in Patent No. 1,467,960, issued to me September 11, 1923. The transfer valve comprises a cylindrical casing 111 having a turret 112 rotatable therein. The turret is secured to a shaft 113 which has a gear (not shown) that meshes with the gear 114 (Fig. 1) on the reel shaft 35. By this means the valve turret is rotated in timed relationship with the reel 33 (Fig. 3) so that the star wheel 101 will eject the cans one by one into the pockets 115 of the valve. As shown in Fig. 3 a can 116 has just been moved into a pocket of the valve by the star wheel.

The cans are carried around by the turret and deposited in the reel 117 of a cooler 118 of similar construction to the sterilizer except that a cooling medium, such as a bath of cool water, is maintained therein to effect cooling of the cans as they progress therethrough. The cooler reel may be of the same construction as that in the sterilizer, a series of rolls 119 being employed in the same manner as the rolls 50 in the sterilizer to rotate the cans on their own axes and propel them along the cooler canway 120.

Having thus described my invention and in what manner the same may be used what I claim as new and desire to protect by Letters Patent is:

1. Apparatus of the character described comprising a chamber having an inlet and an outlet, a reel rotatable within said chamber, said reel having a plurality of equally spaced apart container pushing rolls disposed longitudinally thereon and extending from said inlet to said outlet, the adjacent rolls forming troughs between them for receiving and supporting containers, means to introduce the containers in succession through said inlet and to deposit them one by one in the troughs between said rolls, and means to move the containers axially along said rolls from said inlet to said outlet when pushed by said rolls upon rotation of said reel.

2. Apparatus of the character described comprising a chamber having an inlet and an outlet, a reel rotatable within said chamber, said reel having a plurality of equally spaced apart container pushing rolls disposed longitudinally thereon and extending from said inlet to said outlet, the adjacent rolls forming troughs between them for receiving and supporting containers, means to rotate said rolls relative to said reel whereby to impart rotation to the containers about their own axes, means to introduce the containers in succession through said inlet and to deposit them one by one in the troughs between said rolls, and means to move the containers axially along said rolls from said inlet to said outlet when pushed by said rolls upon rotation of said reel.

3. Apparatus of the character described comprising a chamber having an inlet and an outlet, a reel rotatable within said chamber, said reel having a plurality of equally spaced apart container pushing rolls disposed longitudinally thereon and extending from said inlet to said outlet, the adjacent rolls forming troughs between them for receiving and supporting containers, means to rotate said rolls relative to said reel whereby to impart rotation to the containers about their own axes, means to introduce the containers in succession through said inlet and to deposit them one by one in the troughs between said rolls, and a guideway to lead the containers axially along said rolls from said inlet to said outlet, said guideway having a portion extending longitudinally of said reel for maintaining each container in contact with at least one roll when the container rolls out of the trough between adjacent rolls, during the rotation of said reel.

4. Apparatus of the character described comprising a chamber and a reel rotatable in said chamber, said reel having a plurality of longitudinally-extending container pushing rolls spaced apart around said reel a distance less than the diameter of the containers for supporting the containers thereon in the valleys therebetween.

5. Apparatus of the character described comprising a chamber, a reel rotatable in said chamber, said reel having a plurality of longitudinally-extending container pushing rolls, said rolls being spaced apart around said reel a distance less than the diameter of the containers whereby adjacent rolls are adapted to support the containers during at least part of the rotation of said reel, and a guide rail having a flange for engaging the containers, said flange being disposed at a distance from said rolls less than the diameter of the containers whereby one of said rolls is in contact with the containers when the latter engage said flange during a further portion of the rotation of said reel.

6. Apparatus of the character described comprising a rotary support, a container guideway surrounding said support including a surface for engaging and over which the containers may be rolled, a plurality of container pushing rolls on said support for engaging and advancing the containers along said guideway, and means for rotating said rolls to impart rotation to the containers about their own axes, the position of said rolls relative to each other and to said guideway surface being such that the space between adjacent rolls and between said rolls and said surface is less than the width of a container.

7. Apparatus of the character described comprising a rotary support, a container guideway surrounding said support including a surface for engaging and over which the containers may roll during part of the rotation of said support, a plurality of container pushing rolls carried by said support for engaging and advancing the containers along said guideway, and means for rotating said rolls to impart rotation to the containers about their own axes, the position of said rolls relative to each other being such that adjacent rolls form a trough between them in which to support and rotate the containers when not in engagement with said guideway surface, and the position of said rolls relative to said guideway surface being such that the containers are engaged by one of said rolls when the containers are also in an engagement with said guideway surface.

8. Apparatus of the character described comprising a rotary support, a container guideway having a surface substantially concentric to the axis of said support and over which the containers are rolled during part of the revolution of said support, a pair of rotatable container pushing rolls on said support and movable therewith to engage and advance containers along said guideway, and means for rotating said rolls to impart rotation to the containers about their own axes, the position of said rolls relative to each other being such that they form a trough between them in which to support and rotate containers advanced thereby not in engagement with said guideway surface and the position of said rolls relative to said guideway surface being such that there is substantially always one of said rolls in engagement with the containers when the containers in said trough are advanced along said guideway in engagement with said surface of said guideway.

9. Apparatus of the character described comprising a container guideway, a rotary support, a plurality of container pushing rolls arranged on said support with their axes substantially paralleling that of said support, means to rotate said support whereby said rolls advance the containers along said guideway, and means to rotate said rolls to impart rotation to the containers, said rolls being spaced apart on said support to provide a trough between them for receiving and supporting containers during advancement thereof along said guideway, the said rolls constituting the sole means for engaging and advancing the containers along said guideway and there being as many troughs as there are rolls.

10. Apparatus of the character described comprising a rotary support, a container guideway surrounding said support including a surface for engaging and over which the containers may be rolled, a plurality of container pushing rolls spaced on said support for engaging and advancing the containers along said guideway, the spacing of said rolls relative to said guideway surface being such that between the rolls and said guideway surface, troughs are formed for supporting the containers during their advancement along said guideway, and means to rotate said rolls at a greater peripheral speed than the peripheral speed of the containers due to rolling over said guideway surface, whereby to prevent pinching of the containers in the troughs between said rolls and said guideway surface while advancing the containers along said guideway.

11. Apparatus of the character described comprising a chamber having an inlet and an outlet, a support rotatable within said chamber, a helical guideway surrounding said support for leading containers from said inlet to said outlet, a plurality of substantially parallel container pushing rolls rotatably mounted on said support for engaging and advancing containers along said guideway, and means for rotating said rolls in a direction opposite to that of said support to impart rotation to the containers about their own axes, the adjacent rolls being positioned relative to each other to form a trough to rotatably support the containers at the top portion of the chamber during each rotation of said support, and said guideway having a portion extending substantially parallel to said rolls for maintaining each container in contact with a roll substantially throughout the remainder of each rotation of said support, whereby the containers will be continuously rotated about their own axes while advancing from said inlet to said outlet during rotation of said support.

12. Apparatus of the character described comprising a chamber having a guideway therein, a plurality of container pushing rolls for advancing the containers along said guideway, said rolls being spaced from each other a distance less than the diameter of the containers for engaging and supporting the containers thereon in the valleys therebetween, and actuating means for rotating the rolls to rotate the containers supported thereby about their own axes.

13. Apparatus of the character described comprising a chamber having a helical guideway therein, a rotatable reel, rotary means on said reel, said reel and rotary means cooperating with the guideway for advancing containers along the same through said chamber, said rotary means being spaced from each other a distance less than the diameter of the containers for supporting the containers thereon in the valleys therebetween, and means for rotating the rotary means to rotate the containers supported thereby about their own axes.

14. Apparatus of the character described comprising a chamber having a guideway, a reel rotatable in said chamber, said reel having a plurality of longitudinally extending can pushing rolls, said rolls being spaced apart a distance less than the diameter of the containers for supporting the containers thereon in the valleys therebetween during a part of the revolution of the reel, said guideway having a surface for maintaining the containers in contact with one of the rolls during another part of the revolution of said reel, and means for rotating the rolls at a peripheral speed in excess of the normal peripheral speed of the containers due to rolling on said guideway, whereby to facilitate rotation of the containers about their own axes during the entire revolution of said reel.

15. Apparatus of the character described comprising a chamber having a guideway therein, means for advancing containers along said guideway, said means including rotary elements spaced from each other a distance less than the diameter of the containers for engaging and supporting the containers thereon, and means for rotating said elements to rotate the containers supported thereby about their own axes.

ALBERT R. THOMPSON.